US012431675B2

(12) United States Patent
Kumamoto

(10) Patent No.: US 12,431,675 B2

(45) Date of Patent: Sep. 30, 2025

(54) CABLE CONNECTOR ASSEMBLY

(71) Applicant: Tyco Electronics Japan G.K., Kawasaki (JP)

(72) Inventor: Tadashi Kumamoto, Kawasaki (JP)

(73) Assignee: TE Connectivity Japan G.K., Kawasaki (JP)

( * ) Notice: Subject to any disclaimer, the term of this patent is extended or adjusted under 35 U.S.C. 154(b) by 373 days.

(21) Appl. No.: 17/729,602

(22) Filed: Apr. 26, 2022

(65) Prior Publication Data

US 2022/0255273 A1 Aug. 11, 2022

Related U.S. Application Data

(63) Continuation of application No. PCT/JP2020/040277, filed on Oct. 27, 2020.

(30) Foreign Application Priority Data

Nov. 1, 2019 (JP) ................................. 2019-199527

(51) Int. Cl.

*H01R 24/40* (2011.01)
*H01R 4/18* (2006.01)

(Continued)

(52) U.S. Cl.

CPC ............. *H01R 24/40* (2013.01); *H01R 4/183* (2013.01); *H01R 13/516* (2013.01); *H01R 13/6592* (2013.01)

(58) Field of Classification Search

CPC ...... H01R 24/40; H01R 4/183; H01R 13/516; H01R 13/6592; H01R 2103/00;

(Continued)

(56) References Cited

U.S. PATENT DOCUMENTS 4,418,983 A * 12/1983 Bowen ................. G02B 6/3878 385/86
6,533,609 B2 * 3/2003 Koide .................. H01R 9/0518 439/585

(Continued)

FOREIGN PATENT DOCUMENTS

CN 102318140 A 1/2012
EP 1174949 A1 1/2002

(Continued)

OTHER PUBLICATIONS

Extended European Search Report dated Nov. 3, 2023, corresponding to Application No. 20883355.8-1201, 7 pages.

(Continued)

*Primary Examiner* — Truc T Nguyen

(74) *Attorney, Agent, or Firm* — Barley Snyder

(57) ABSTRACT

A cable connector assembly includes a coaxial connector, a shielded cable, and a ferrule. The coaxial connector has an inner terminal, an insulating housing surrounding the inner terminal, and an outer terminal surrounding the insulating housing. The shielded cable has an inner conductor connected to the inner terminal, an insulation layer surrounding the inner conductor, and an outer conductor surrounding the insulation layer. The ferrule is positioned inside the outer terminal and crimped to the outer terminal. The outer terminal has a plurality of catching portions formed in different positions in an axial direction of the shielded cable and catching on the ferrule to restrain the shielded cable from being pulled out.

18 Claims, 6 Drawing Sheets

(51) Int. Cl.
*H01R 13/516* (2006.01)
*H01R 13/6592* (2011.01)

(58) Field of Classification Search
CPC .... H01R 9/0518; H01R 13/639; H01R 4/184; H01R 13/02; H01R 24/38; H01R 13/59; H01R 13/64; H01B 7/00
See application file for complete search history.

(56) References Cited

U.S. PATENT DOCUMENTS

| | | | | |
|---|---|---|---|---|
| 7,207,839 | B1 | 4/2007 | Shelly et al. | |
| 9,608,369 | B1 * | 3/2017 | Brandt | H01R 13/6276 |
| 9,673,578 | B1 * | 6/2017 | Lane | H01R 13/631 |
| 10,468,786 | B2 | 11/2019 | De Cloet et al. | |
| 2012/0202372 | A1 * | 8/2012 | Hardy | H01R 13/5804 439/585 |
| 2017/0222349 | A1 * | 8/2017 | Kleymann | H01R 9/03 |
| 2017/0271784 | A1 * | 9/2017 | De Cloet | H01R 4/20 |
| 2021/0141169 | A1 * | 5/2021 | Leeson | G02B 6/545 |
| 2021/0159644 | A1 * | 5/2021 | Evans | H01R 13/6477 |
| 2023/0318234 | A1 * | 10/2023 | Evans | H01R 13/65914 439/567 |

FOREIGN PATENT DOCUMENTS

| | | | |
|---|---|---|---|
| JP | 62-66187 | U1 | 4/1987 |
| JP | 2005-149972 | A | 6/2005 |
| JP | 2017-139227 | A | 8/2017 |
| JP | 2017-168440 | A | 9/2017 |
| WO | 2019158384 | A1 | 8/2019 |

OTHER PUBLICATIONS

PCT International Search Report and English translation, Intl App No. PCT/JP2020/040277, dated Dec. 28, 2020, 8 pages.

* cited by examiner

CABLE CONNECTOR ASSEMBLY

CROSS-REFERENCE TO RELATED APPLICATIONS

This application is a continuation of PCT International Application No. PCT/JP2020/040277, filed on Oct. 27, 2020, which claims priority under 35 U.S.C. § 119 to Japanese Patent Application No. 2019-199527, filed on Nov. 1, 2019.

FIELD OF THE INVENTION

The present invention relates to a cable connector assembly in which a coaxial connector is connected by crimping to a shielded cable.

BACKGROUND

When a cable connector assembly is manufactured, an inner conductor of a shielded cable (including a coaxial cable) is connected by crimping to an inner terminal of a coaxial connector. Then, the inner terminal is inserted into an insulating housing of the coaxial connector. Thereafter, an outer conductor of the shielded cable is connected by crimping to an outer terminal of the coaxial connector. Here, when the outer conductor of the shielded cable is connected by crimping to the outer terminal of the coaxial connector, a ferrule is used to avoid diameter reduction of an insulation layer due to crimping. In addition, it is desired that the role of catching on the outer terminal when a force that pulls the shielded cable out of the coaxial connector is applied to the shielded cable, thereby preventing the shielded cable from being pulled out, is also assigned to the ferrule.

Japanese Patent Application No. 2017-168440A discloses a cable connector assembly having a structure in which a locking protrusion provided on the ferrule is caught on a catching tab (locking lug) provided on the outer terminal of the coaxial connector, thereby preventing pullout.

The inner terminal is required to be positioned with high accuracy in a predetermined longitudinal position. Therefore, the inner terminal inserted into the insulating housing is located by abutment against a predetermined portion of the housing or otherwise. On the other hand, the ferrule is an element whose main purpose is to avoid diameter reduction of the insulation layer. Accordingly, quite a rough longitudinal position accuracy is allowed if it is only necessary to achieve this main purpose. However, if this ferrule is intended to serve a falling-out preventive purpose, the ferrule is also required to be located with high accuracy because it is necessary to prevent a longitudinal positional shift of the inner terminal. For example, the locking protrusion of the ferrule of JP 2017-168440A is required to be located accurately with respect to the catching tab (locking lug) of the outer terminal. This is because, if they are in positions distant longitudinally from each other, the inner terminal will shift its position significantly until the locking protrusion catches on the catching tab. In addition, if the lock protrusion is in a position behind the catching tab, the locking protrusion may fail to be caught thereon and the shielded cable may fall out.

In view of these circumstances, an object of the present invention is to provide a cable connector assembly having a reduced longitudinal mounting position accuracy of a ferrule and assigning a falling-out preventive role to the ferrule.

SUMMARY

A cable connector assembly includes a coaxial connector, a shielded cable, and a ferrule. The coaxial connector has an inner terminal, an insulating housing surrounding the inner terminal, and an outer terminal surrounding the insulating housing. The shielded cable has an inner conductor connected to the inner terminal, an insulation layer surrounding the inner conductor, and an outer conductor surrounding the insulation layer. The ferrule is positioned inside the outer terminal and crimped to the outer terminal. The outer terminal has a plurality of catching portions formed in different positions in an axial direction of the shielded cable and catching on the ferrule to restrain the shielded cable from being pulled out.

BRIEF DESCRIPTION OF THE DRAWINGS

The invention will now be described by way of example with reference to the accompanying Figures, of which.

DETAILED DESCRIPTION OF THE EMBODIMENT(S)

An embodiment of the present invention will be described below.

Figure 1A:
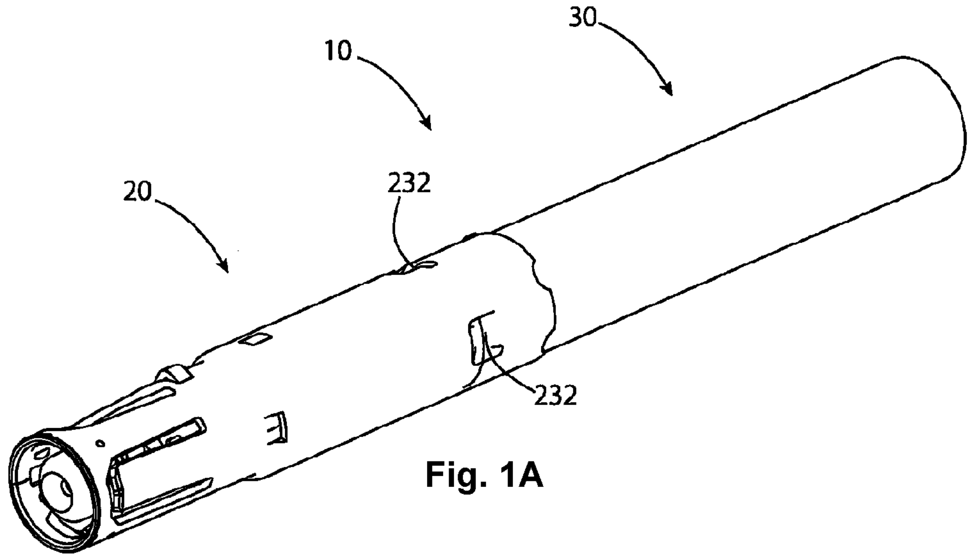
FIG. 1A is a perspective view of a cable connector assembly according to an embodiment.

A cable connector assembly 10, shown in FIG. 1A, comprises a coaxial connector 20, a shielded cable 30, and a ferrule 40.

Figure 2:
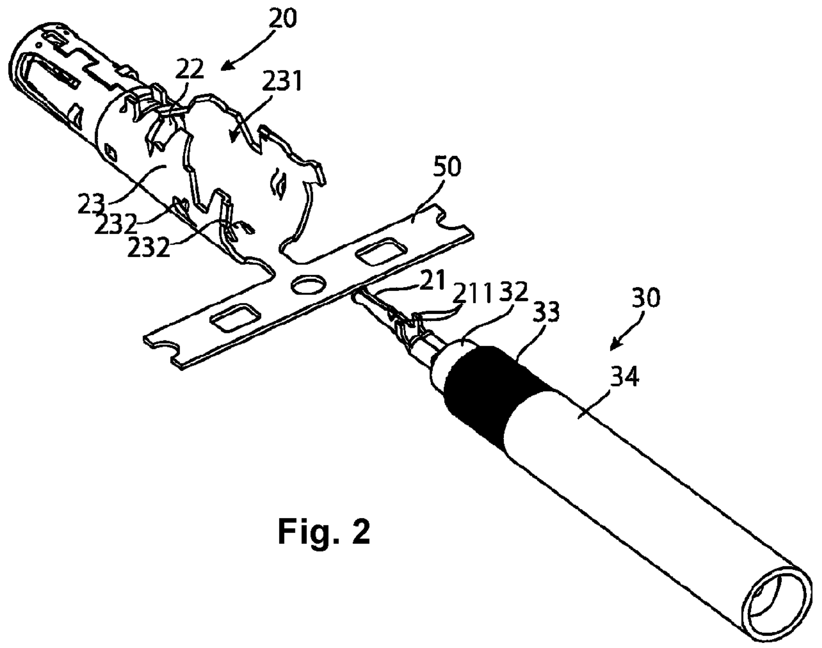
FIG. 2 is a perspective view of a coaxial connector and a shielded cable before assembly.
Figure 3A:
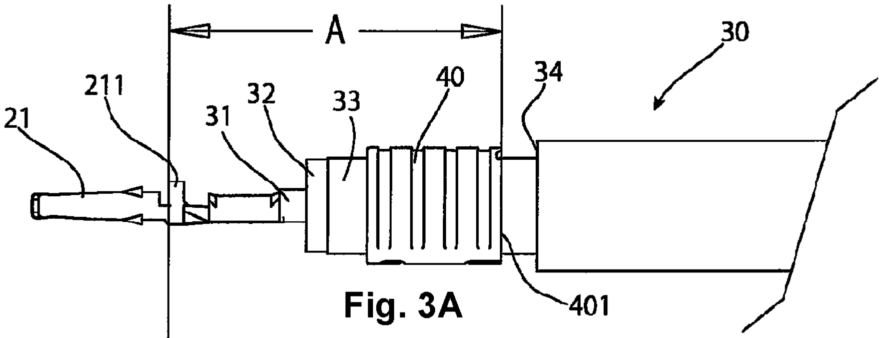
FIG. 3A is a side view of the shielded cable with an inner terminal and a ferrule.
Figure 3B:
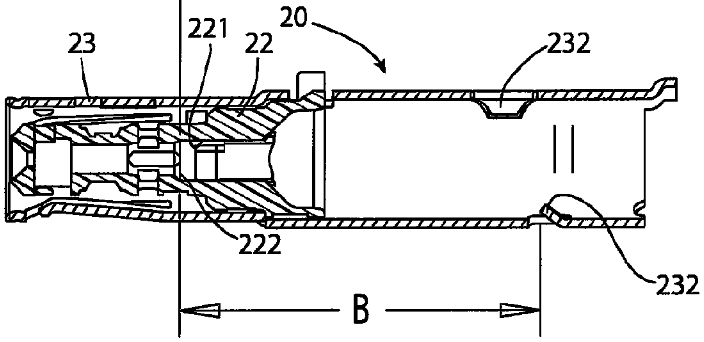
FIG. 3B is a sectional side view of the coaxial connector.

The coaxial connector 20 has an inner terminal 21, an insulating housing 22, and an outer terminal 23, as shown in FIGS. 3A and 3B. In an embodiment, the inner terminal 21 is a female terminal, and is connected by crimping to an inner conductor 31 of the shielded cable 30. The insulating housing 22 has an inner space 221. The inner terminal 21 is inserted into the inner space 221, and the insulating housing 22 surrounds the inner terminal 21. In addition, the outer terminal 23 has a tubular shape, and surrounds the insulating housing 22. The outer terminal 23 is connected to a carrier 50 in FIG. 2.

As shown in FIG. 3A, the shielded cable 30 has the inner conductor 31, an insulation layer 32, an outer conductor 33, and a jacket 34. As described above, the inner terminal 21 is connected by crimping to the inner conductor 31. The insulation layer 32 surrounds the inner conductor 31. The outer conductor 33 surrounds the insulation layer 32. Furthermore, the jacket 34 surrounds the outer conductor 33.

The ferrule 40 is positioned around the outer conductor 33, as shown in FIG. 3A.

At the time of assembling the shield connector assembly 10, the insulation layer 32 is cut off to expose a leading end portion of the inner conductor 31 of the shielded cable 30. Then, the jacket 34 is cut off to expose the outer conductor 33. Then, the ferrule 40 is mounted to a portion where the jacket 34 is cut off and the outer conductor 33, the insulation layer 32, and the inner conductor 31 remain. Then, a portion in front of the ferrule 40 of the outer conductor 33 is folded back over the ferrule 40. The outer conductor 33 in the folded state is shown in FIG. 2. Therefore, the ferrule 40 is covered with the outer conductor 33 and is not shown in FIG. 2. In order to illustrate the ferrule 40, the folded portion of the outer conductor 33 is not shown in FIGS. 3A and 3B and in FIGS. 4A and 4B and the subsequent drawings described later. Then, the inner terminal 21 is connected by crimping to the inner conductor 31 as shown in FIG. 3A.

The shielded cable 30 processed up to this stage is shown in FIG. 2.

The inner terminal 21 connected by crimping to the inner conductor 31 of the shielded cable 30 is inserted into the insulating housing 22 positioned inside the outer terminal 23. The inner terminal 21 is inserted into the insulating housing 22, and an abutting portion 211 of the inner terminal 21 is abutted against a locating wall 222 (see FIG. 3B) of the insulating housing 22. Thereby, the inner terminal 21 is positioned in an accurate position.

At the time of this insertion, the outer terminal 23 has a rear portion 231 in an expanded state, as shown in FIG. 2. The inner terminal 21 is inserted into the insulating housing 22 inside the outer terminal 23 in this state, and the rear portion 231 of the outer terminal 23 is crimped to the outer conductor 33 folded over the ferrule 40 (see FIG. 3A). Since the ferrule 40 is positioned, the insulation layer 32 is not crushed and retains its original diameter. The coaxial connector 20 in a shape after crimping is shown in FIG. 1A.

Figure 1B:
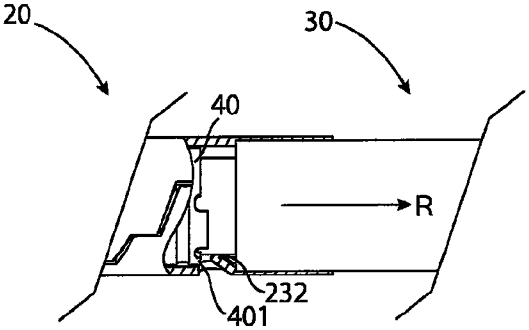
FIG. 1B is a sectional side view of the cable connector assembly.

As shown in FIGS. 1A and 1B, a catching portion 232 is formed on the outer terminal 23. This catching portion 232 is a protrusion which is lanced inward in the form of a cantilever and which extends obliquely inward in a direction where its rear end serves as a fixed end and its front end serves as a free end. As shown in FIGS. 3A and 3B, in comparison between a length A from the abutting portion 211 of the inner terminal 21 to a rear end edge 401 of the ferrule 40 and a length B from the locating wall 222 of the insulating housing 22 to the catching portion 232, the length B is a little longer than the length A. Accordingly, this catching portion 232 is positioned immediately behind the rear end edge 401 of the ferrule 40, as shown in FIG. 1B. Here assume that a force in the direction of an arrow R shown in FIG. 1B, namely a force in the direction of pulling the shielded cable 30 out of the coaxial connector 20, is applied to the shielded cable 30. Thereupon, the rear end edge 401 of the ferrule 40 is caught on the catching portion 232, and the shielded cable 30 is prevented from falling out. The ferrule 40 moves only a small distance rearward until it is caught on the catching portion 232 immediately therebehind, but such a moving amount is within the margin of error of the arrangement position of the inner terminal 21, and does not cause any functional problem.

Here, the catching portion 232 is formed at a plurality of locations (two locations in the present embodiment) different in the longitudinal direction. The reason will be explained below.

Figure 4A:
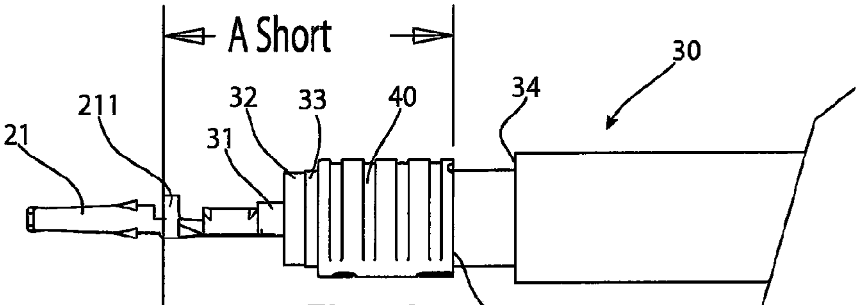
FIG. 4A is a side view of the shielded cable with the inner terminal and the ferrule in a short position.
Figure 4B:
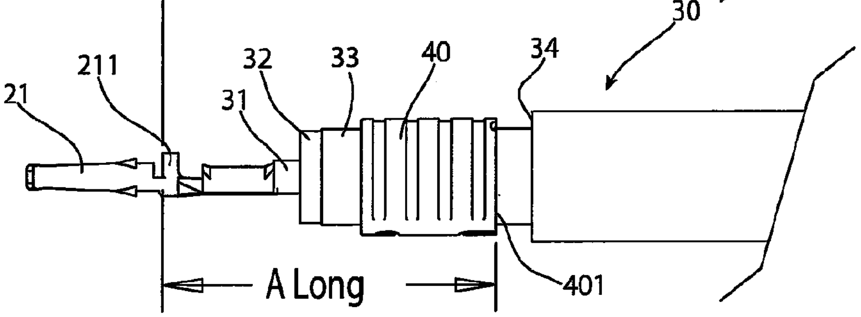
FIG. 4B is a side view of the shielded cable with the inner terminal and the ferrule in a long position.

FIGS. 4A and 4B are diagrams illustrating variation in the position of the ferrule 40.

The ferrule 40 varies significantly in length from the abutting portion 211 of the inner terminal 21 to the rear end portion 401 of the ferrule 40 within a range from A Short shown in FIG. 4A to A Long shown in FIG. 4B. Assume that the catching portion 232 is provided at only one longitudinal location. Then assume that this catching portion 232 is positioned immediately behind the rear end edge 401 of the ferrule 40 in the A Long position shown in FIG. 4B. At this time, if the ferrule 40 is in the A Short position shown in FIG. 4A, when a force in the pullout direction is applied to the shielded cable 30, the inner terminal 21 moves significantly until the rear end edge 401 of the ferrule 40 is caught on the catching portion 232. The length of this movement is a length that can cause the coaxial connector 20 to lose its normal function.

In contrast, assume that the catching portion 232 at the only one location is positioned immediately behind the rear end edge 401 of the ferrule 40 in the A Short position shown in FIG. 4A. Then assume that the ferrule 40 is in the A Long position shown in FIG. 4B. This means that the ferrule 40 and the catching portion 232 overlap with each other. In this case, the rear end edge 401 of the ferrule 40 cannot be caught on the catching portion 232, and the shielded cable 30 and the inner terminal 21 may fall out of the coaxial connector 20.

Therefore, the catching portion 232 is provided at two longitudinal locations in the present embodiment.

Figure 5A:
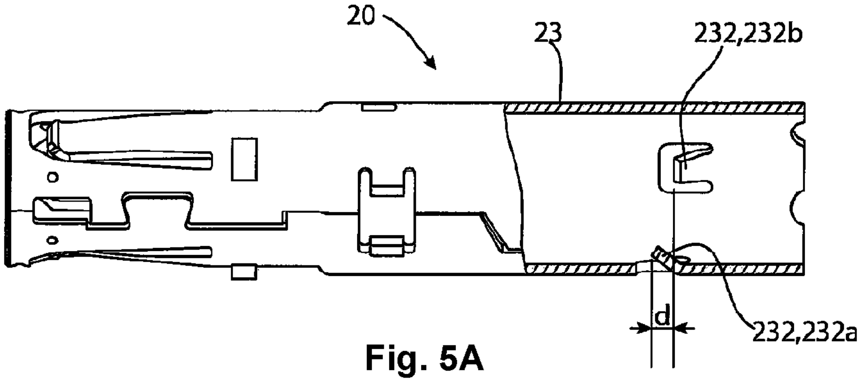
FIG. 5A is a partially sectional side view of the coaxial connector.
Figure 5B:
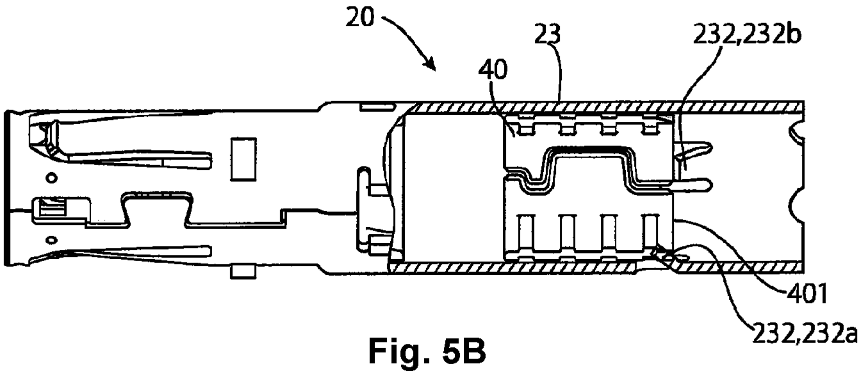
FIG. 5B is a partially sectional side view of the coaxial connector with the ferrule in the long position of FIG. 4B.

Two catching portions 232 are shown in FIGS. 5A and 5B. These two catching portions 232 are provided in positions shifted longitudinally by a distance d, as shown in FIG. 5A. This distance d is a distance the internal terminal 21 moves without influence on the function. The catching portions 232 are formed at mutually different positions in the axial direction.

As shown in FIG. 5B, a front catching portion 232*a* of these two catching portions 232 is in a position overlapping with the ferrule 40 in the A Long position. On the other hand, a rear catching portion 232*b* is positioned immediately behind the ferrule 40 in the A Long position. Therefore, the rear catching portion 232*b* fulfills a pullout preventive role even when the ferrule 40 is in the A Long position.

Figure 6A:
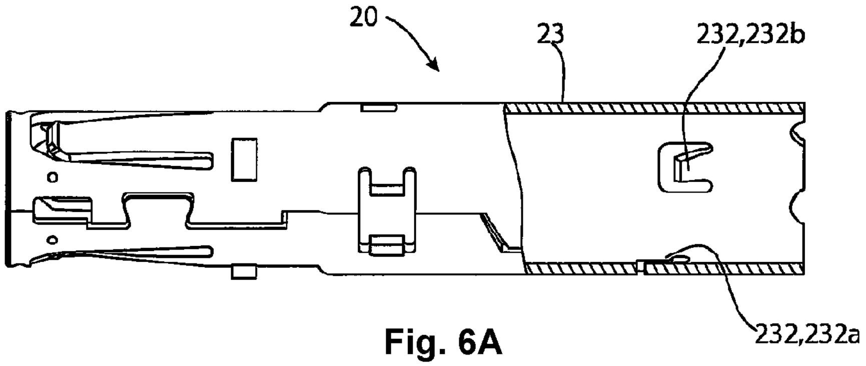
FIG. 6A is a partially sectional side view of the coaxial connector after crimping.
Figure 6B:
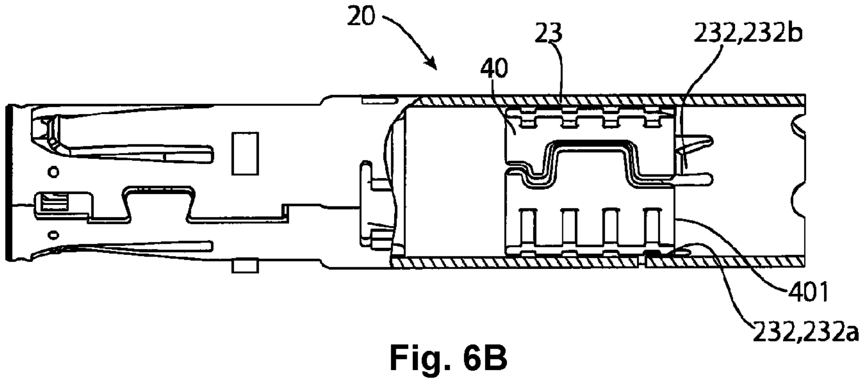
FIG. 6B is a partially sectional side view of the coaxial connector after crimping with the ferrule in the long position of FIG. 4B.

FIGS. 6A and 6B show the catching portion 232 after crimping. The catching portion 232 is a protrusion which is lanced inward in the form of a cantilever and which extends obliquely inward in a direction where its rear end serves as the fixed end and its front end serves as the free end, as shown in FIGS. 5A and 5B. Therefore, the catching portion 232*a* in the position overlapping with the ferrule 40 is pressed back and returns, by crimping, to its prior-to-lancing shape that does not interfere with crimping at all.

If the ferrule 40 is in the A Short position shown in FIG. 4A, the front catching portion 232*a* fulfills a falling-out preventive role. When a pullout force acts, the ferrule 40 is caught on any one of the catching portions 232, thereby preventing a positional shift beyond an allowable range and pullout of the inner terminal 21.

It should be noted that the catching portion 232 is provided at two longitudinal locations in the present embodiment, but the catching portion 232 is not limited to two locations. The catching portion 232 may be provided at three or more locations with the range of variation in the mounting position of the ferrule 40 and the allowable range of a positional shift of the internal terminal 21 taken into consideration.

According to the cable connector assembly 10 of the present invention described above, a falling-out preventive role can be assigned to the ferrule 40 despite the low longitudinal mounting position accuracy of the ferrule 40.

What is claimed is:

1. A cable connector assembly, comprising:

a coaxial connector having an inner terminal, an insulating housing surrounding the inner terminal, and an outer terminal surrounding the insulating housing, the inner terminal positionable within insulating housing within a predetermined range of longitudinal positions in an axial direction of the shielded cable wherein proper functionality of the coaxial connector is realized;

a shielded cable having an inner conductor connected to the inner terminal, an insulation layer surrounding the inner conductor, and an outer conductor surrounding the insulation layer; and a ferrule positioned inside the outer terminal and crimped to the outer conductor in a longitudinal position adapted to maintain the inner terminal in the predetermined range of longitudinal positions, the outer terminal has a plurality of catching portions formed in different positions in an axial direction of the shielded cable and adapted to catch on an axially facing end of the ferrule to restrain the shielded cable from being pulled out and prevent the inner terminal from being displaced into a position outside of the predetermined range of longitudinal positions, wherein a first catching portion and a second catching portion of the plurality of catching portions are separated in the longitudinal direction by a predetermined distance corresponding to the predetermined range of longitudinal positions of the inner terminal, such that the inner terminal remains in the predetermined range of longitudinal positions with the axially facing end of the ferrule engaged with either of the first catching portion or the second catching portion.

2. The cable connector assembly of claim 1, wherein the catching portion has a rear end that is a fixed end and a front end as a free end.

3. The cable connector assembly of claim 2, wherein the first catching portion is arranged closer to a free end of the inner terminal than the second catching portion.

4. The cable connector assembly of claim 3, wherein each of the plurality of catching portions is a protrusion extending obliquely inward.

5. The cable connector assembly of claim 4, wherein, with the axially facing end of the ferrule engaged with the first catching portion, the second catching portion is not engaged with the ferrule.

6. The cable connector assembly of claim 3, wherein, with the axially facing end of the ferrule engaged with the second catching portion, the first catching portion is deformed outwardly by a force exerted by the ferrule after crimping of the outer terminal.

7. A cable connector assembly, comprising:

a coaxial connector having an inner terminal, an insulating housing surrounding the inner terminal, and an outer terminal surrounding the insulating housing, the inner terminal positionable within insulating housing within a predetermined range of longitudinal positions in an axial direction of the shielded cable wherein proper functionality of the coaxial connector is realized; and a ferrule positioned inside the outer terminal and adapted to be crimped to an outer conductor of a shielded cable in a longitudinal position which maintains the inner terminal in the predetermined range of longitudinal positions, the outer terminal has a first catching portion and a second catching portion formed in different positions in an axial direction of the connector and catching on the ferrule to prevent the inner terminal from being displaced a position outside of the predetermined range of longitudinal positions, wherein a first catching portion and a second catching portion of the plurality of catching portions are separated in the longitudinal direction by a predetermined distance corresponding to the predetermined range of longitudinal positions of the inner terminal such that the inner terminal remains in the predetermined range of longitudinal positions with a rear facing end of the ferrule engaged with either of the first catching portion or the second catching portion.

8. The cable connector assembly of claim 7, wherein the first and second catching portions each has a rear end that is a fixed end and a front end as a free end.

9. The cable connector assembly of claim 8, wherein the first catching portion is arranged closer to a free end of the inner terminal than the second catching portion.

10. The cable connector assembly of claim 9, wherein at least one of the first and second catching portions is a protrusion extending obliquely inward.

11. The cable connector assembly of claim 10, wherein, with the axially facing end of the ferrule engaged with the first catching portion, the second catching portion is not engaged with the ferrule and extends obliquely inwardly.

12. The cable connector assembly of claim 10, wherein, with the axially facing end of the ferrule engaged with the second catching portion, the first catching portion abuts an intermediate portion of the ferrule and does not extend obliquely inwardly.

13. The cable connector assembly of claim 7, further comprising a shielded cable having an inner conductor connected to the inner terminal.

14. The cable connector assembly of claim 13, wherein the shielded cable has an insulation layer surrounding the inner conductor and an outer conductor surrounding the insulation layer.

15. A method of forming a cable connector assembly comprising the steps of:

connecting an inner terminal of a coaxial connector to an inner conductor of a shielded cable;

positioning the inner terminal within an insulating housing of the coaxial connector and inside of an outer terminal of the coaxial connector, the inner terminal positioned within the insulating housing within a predetermined range of longitudinal positions in an axial direction of the shielded cable wherein proper functionality of the coaxial connector is realized;

crimping a ferrule onto an outer conductor of the shielded cable in a longitudinal position adapted to maintain the inner terminal in the predetermined range of longitudinal positions; and crimping the outer terminal onto the ferrule, the outer terminal having a first catching portion and a second catching portion formed in different positions in an axial direction of the connector and catching on the ferrule to prevent the inner terminal from being displaced a position outside of the predetermined range of longitudinal positions, wherein a first catching portion and a second catching portion of the plurality of catching portions are separated in the longitudinal direction by a predetermined distance corresponding to the predetermined range of longitudinal positions of the inner terminal such that the inner terminal remains in the predetermined range of longitudinal positions with a rear facing end of the ferrule engaged with either of the first catching portion or the second catching portion.

16. The method of claim 15, wherein:

the first catching portion is formed closer to a free end of the inner terminal than the second catching portion; and each catching portion includes a protrusion having a free end extending obliquely inward.

17. The method of claim 16, wherein the step of crimping the outer terminal includes engaging the axially facing end of the ferrule with the free end of the first catching portion, wherein the second catching portion is not engaged with the ferrule.

18. The method of claim 16, wherein the step of crimping the outer terminal includes:

engaging the axially facing end of the ferrule with the free end of the second catching portion; and engaging the free end of the first catching portion with an intermediate portion of the ferrule, wherein the ferrule deforms the free end of the first catching portion outwardly in a direction away from the ferrule.

* * * * *